United States Patent
Shiramatsu et al.

(10) Patent No.: US 8,102,625 B2
(45) Date of Patent: Jan. 24, 2012

(54) MAGNETIC HEAD SLIDER

(75) Inventors: Toshiya Shiramatsu, Kanagawa (JP); Kouji Miyake, Hokkai-do (JP)

(73) Assignee: Hitachi Global Storage Technologies Netherlands B.V. (NL)

(*) Notice: Subject to any disclaimer, the term of this patent is extended or adjusted under 35 U.S.C. 154(b) by 818 days.

(21) Appl. No.: 12/231,256

(22) Filed: Aug. 28, 2008

(65) Prior Publication Data

US 2009/0073597 A1  Mar. 19, 2009

(30) Foreign Application Priority Data

Aug. 31, 2007  (JP) ............................... 2007-225768

(51) Int. Cl.
*G11B 5/127* (2006.01)
*G11B 7/00* (2006.01)
(52) U.S. Cl. ................. 360/125.74; 360/125.75
(58) Field of Classification Search ........... 360/125.75, 360/125.74, 125.32, 125.31
See application file for complete search history.

(56) References Cited

U.S. PATENT DOCUMENTS

| | | | | |
|---|---|---|---|---|
| 6,636,460 B2* | 10/2003 | Akiyama et al. | ............ | 369/13.14 |
| 6,731,461 B2* | 5/2004 | Yamada et al. | ........... | 360/125.72 |
| 6,859,343 B1* | 2/2005 | Alfoqaha et al. | ......... | 360/125.72 |
| 7,193,817 B2* | 3/2007 | Lille | .............. | 360/128 |
| 7,262,936 B2* | 8/2007 | Hamann et al. | ............... | 360/128 |
| 7,633,715 B2* | 12/2009 | Higuchi | ................. | 360/125.74 |
| 7,903,373 B2* | 3/2011 | Kobayashi et al. | ....... | 360/125.31 |
| 7,911,882 B2* | 3/2011 | Shimazawa et al. | ........ | 369/13.33 |
| 8,004,794 B2* | 8/2011 | Zhou et al. | ................ | 360/125.31 |
| 8,014,101 B2* | 9/2011 | Shimazawa et al. | ...... | 360/125.31 |
| 2003/0128633 A1* | 7/2003 | Batra et al. | .................. | 369/13.32 |
| 2004/0027717 A1* | 2/2004 | Alfoqaha et al. | ............. | 360/126 |
| 2004/0081031 A1* | 4/2004 | Saga et al. | .................. | 369/13.33 |
| 2006/0187564 A1* | 8/2006 | Sato et al. | ......... | 360/59 |
| 2006/0221482 A1 | 10/2006 | Matsumoto et al. | | |
| 2007/0153417 A1* | 7/2007 | Suh et al. | ....................... | 360/125 |
| 2007/0286031 A1* | 12/2007 | Matsumoto | ................ | 369/13.13 |
| 2009/0059411 A1* | 3/2009 | Tanaka et al. | .................... | 360/59 |
| 2009/0103208 A1* | 4/2009 | Aoki et al. | ..................... | 360/110 |
| 2010/0046331 A1* | 2/2010 | Takayama et al. | ......... | 369/13.33 |
| 2010/0061200 A1* | 3/2010 | Shimazawa et al. | ....... | 369/13.33 |
| 2010/0073803 A1* | 3/2010 | Sekine et al. | .................... | 360/59 |
| 2010/0118431 A1* | 5/2010 | Tomikawa et al. | .............. | 360/59 |
| 2011/0026378 A1* | 2/2011 | Shimazawa et al. | ....... | 369/13.33 |
| 2011/0122737 A1* | 5/2011 | Shimazawa et al. | ....... | 369/13.24 |

FOREIGN PATENT DOCUMENTS

| | | | |
|---|---|---|---|
| JP | 2001189002 A | * | 7/2001 |
| JP | 2001250201 A | * | 9/2001 |
| JP | 2001-283403 A | | 10/2001 |
| JP | 2001-283405 A | | 10/2001 |

\* cited by examiner

*Primary Examiner* — Julie Anne Watko
(74) *Attorney, Agent, or Firm* — Mahamedi Paradice Kreisman LLP; Christopher J. Brokaw (57) ABSTRACT

Embodiments of the present invention provide a magnetic head slider capable of reducing thermal protrusion attributable to a heating mechanism for heat-assisted recording. According to one embodiment, a magnetic head slider for heat-assisted recording includes an insulating film formed on an end surface of a slider, and a read element, a write device and a heating mechanism for heating a recording medium embedded in the insulating film. The heating mechanism includes an optical waveguide and a near-field light emitting device. A heat radiating film of a material having a thermal conductivity higher than that of the insulating film is formed near the heating mechanism so that one end surface thereof is exposed in an air bearing surface.

7 Claims, 14 Drawing Sheets

MAGNETIC HEAD SLIDER

CROSS-REFERENCE TO RELATED APPLICATION

The instant nonprovisional patent application claims priority to Japanese Patent Application No. 2007-225768 filed Aug. 31, 2007 and which is incorporated by reference in its entirety herein for all purposes.

BACKGROUND OF THE INVENTION

A magnetic disk drive has a rotating magnetic disk, and a magnetic head slider holding a read/write device, supported by a magnetic head support mechanism provided with a suspension and capable of being positioned with respect to a direction parallel to a diameter of the magnetic disk. The magnetic head slider runs over the magnetic disk relative to the magnetic disk, to read magnetic information recorded on the magnetic disk, and to write magnetic information to the magnetic disk. The magnetic disk slider is caused to float by the wedge effect of an air film serving as an air bearing so that the magnetic head slider may not come into solid contact with the magnetic disk.

A magnetic recording pattern needs to be miniaturized and the coercive force of the recording film of a magnetic recording medium needs to be enhanced to increase the recording density of magnetic recording. Japanese Patent Publication No. 2006-185548 discloses a recording magnetic field having a magnitude of intensity about twice the coercive force of a recording film needs to be created by a magnetic recording head to record magnetic information on a magnetic recording medium. The size of the tip of the magnetic pole of a magnetic device is progressively reduced with the progressive miniaturization of the magnetic recording pattern, and hence the intensity of a magnetic field created by the recording device is limited. Consequently, difficulty in applying a recording magnetic field having a magnitude of intensity about twice the coercive force of the recording film to the recording medium to achieve a still higher recording density becomes a problem.

To solve this problem, there has been proposed a heat-assisted recording method that reduces the coercive force of the recording film by heating a recording film when a write element applies a recording magnetic field to a recording medium to enable a magnetic field that cannot record magnetic information unless the recording film is heated to record magnetic information. Japanese Patent No. 3471285 discloses a heat-assisted recording method that uses a heat source included in a slider. Japanese Patent No. 3441417 discloses a heat-assisted recording method that uses an optical wave guide for a laser beam included in a slider and heats a recording film by near-field light emitted by a near-field light emitting device disposed near a write element when a laser beam passes the near-field light emitting device.

When a magnetic head is provided with a built-in heating mechanism for heat-assisted recording as mentioned above, heat generated by the heating mechanism heats a space around a read/write device included in a magnetic head. Consequently, the size of a thermal protrusion on the order of nanometers occurs due to thermal expansion.

Reduction of the distance between the slider and the magnetic disk of a magnetic disk drive, namely, the floating height of the slider, to increase linear recording density is effective in increasing the recording disk of the magnetic disk drive. Recently, the floating height of the slider has been reduced to 10 nm or below. In designing the floating height of the slider, the reduction of floating height attributable to machining errors, difference in the atmospheric pressure of a working environment and difference in the temperature of a using environment are estimated and a floating height margin is estimated so that the slider may not come into contact with the disk even under the worst condition.

There are two modes of floating height reduction depending on the difference in temperature of the working environment. A first mode of floating height reduction is thermal protrusion of a size on the order of nanometers caused by thermal expansion resulting from heating the vicinities of the read/write device of the head by heat generated by eddy-current loss (iron loss) in the magnetic pole caused by electromagnetic induction that occurs when a recording current flows through the coil and heat generated by the coil when a recording current flows through the coil (ohmic loss). A second mode of floating height reduction is local thermal protrusion of a size on the order of nanometers caused by the rise of environmental temperature resulting from difference in coefficient of linear thermal expansion among the magnetic shield around the read/write device, the metallic material and resins of the magnetic pole, and ceramic materials of other parts.

The size of a thermal protrusion caused by the heating mechanism for heat-assisted recording is added to a size of the thermal protrusions caused by heat generation by recording and the size of a thermal protrusion caused by difference in environmental temperature. Such a thermal protrusion of the added size has a significant effect on the floating height of 10 nm or below and is possible to cause contact between a magnetic head and a magnetic disk.

BRIEF SUMMARY OF THE INVENTION

Embodiments of the present invention provide a magnetic head slider capable of reducing thermal protrusion attributable to a heating mechanism for heat-assisted recording. According to the embodiment of FIG. 1, a magnetic head slider 1 for heat-assisted recording includes an insulating film 26 formed on an end surface of a slider 1a, and a read element 3, a write device 2 and a heating mechanism 25 for heating a recording medium embedded in the insulating film 26. The heating mechanism 25 includes an optical waveguide 23 and a near-field light emitting device 24. A heat radiating film 4 of a material having a thermal conductivity higher than that of the insulating film 26 is formed near the heating mechanism 25 so that one end surface thereof is exposed in an air bearing surface 9.

DETAILED DESCRIPTION OF THE INVENTION

Embodiments of the present invention relate to a magnetic head slider to enable a magnetic disk drive to achieve high-density recording and, more particularly, to a magnetic head slider for heat-assisted recording.

Embodiments of the present invention provide a magnetic head slider capable of reducing thermal protrusion attributable to a heating mechanism for heat-assisted recording.

Embodiments of the present invention provides a magnetic head slider having a heat radiating film of a material having a heat conductivity higher than that of an insulating film of alumina or the like covering a heating mechanism and a read/write device, wherein the heat radiating film is disposed virtually in close contact with the heating mechanism. Thus, heat generated by the heating mechanism for heat-assisted recording may be dissipated to reduce thermal protrusion. Heat-radiation efficiency may be improved and thermal protrusion reducing effect may be improved by forming the heat radiating film in a shape such that the sectional area of a surface, facing an air bearing surface, of the heat radiating film increases gradually toward the air bearing surface.

Embodiments of the present invention may reduce the size of a thermal protrusion attributable to the heating mechanism for heat-assisted recording.

The construction of a magnetic disk drive provided with a magnetic head slider of an embodiment will be briefly described with reference to FIG. 2. The magnetic disk drive 10 includes a magnetic disk 15 storing magnetic information and rotated by a spindle motor 14, and a magnetic head slider 1 provided with a read/write device, supported by a magnetic head support mechanism (load beam) 16 having a suspension, and positioned with respect to a direction parallel to a diameter of the magnetic disk 15. The magnetic head slider 1 moves over the magnetic disk 15 relative to the magnetic disk 15 to read magnetic information recorded on the magnetic disk 15 or to write magnetic information to the magnetic disk 15. The magnetic head slider 1 is caused to float by the wedge effect of an air film serving as an air bearing so that the magnetic head slider 1 may not come directly into solid contact with the magnetic disk 15. A rear end part of the magnetic head slider 1 facing the rotating magnetic disk 15 and exposed to air currents serves as an exit end surface.

Increase of linear recording density by reducing the distance between the magnetic head slider 1 and the magnetic disk 15, namely, the floating height of the slider, is effective in increasing the recording density of the magnetic disk drive 10 and the resultant increase of the capacity of the magnetic disk drive 10 or the miniaturization of the magnetic disk drive 10. Recently, the floating height of the slider has been reduced to a value on the order of 10 nm or 10 nm or below.

The magnetic head slider 1 is attached to the load beam 16 and is loaded toward the surface of the magnetic disk by the load beam 16. The magnetic head slider 1 is moved together with the load beam 16 by a voice coil motor 30 in directions parallel to a diameter of the magnetic disk 15 for a seek operation to execute read/write operation over the entire surface of the magnetic disk 15. While the magnetic disk drive 10 is not in operation or any read/write command is not provided for a predetermined time, the magnetic head slider 1 is retracted so that a lift tab 32 rests on a ramp 34.

Although the magnetic disk drive provided with a load/unload mechanism is shown herein, the magnetic disk drive may be of a contact start/stop system that holds the magnetic head slider 1 at a position corresponding to a specified area in the magnetic disk 15 while the magnetic disk drive is stopped.

Figure 2:
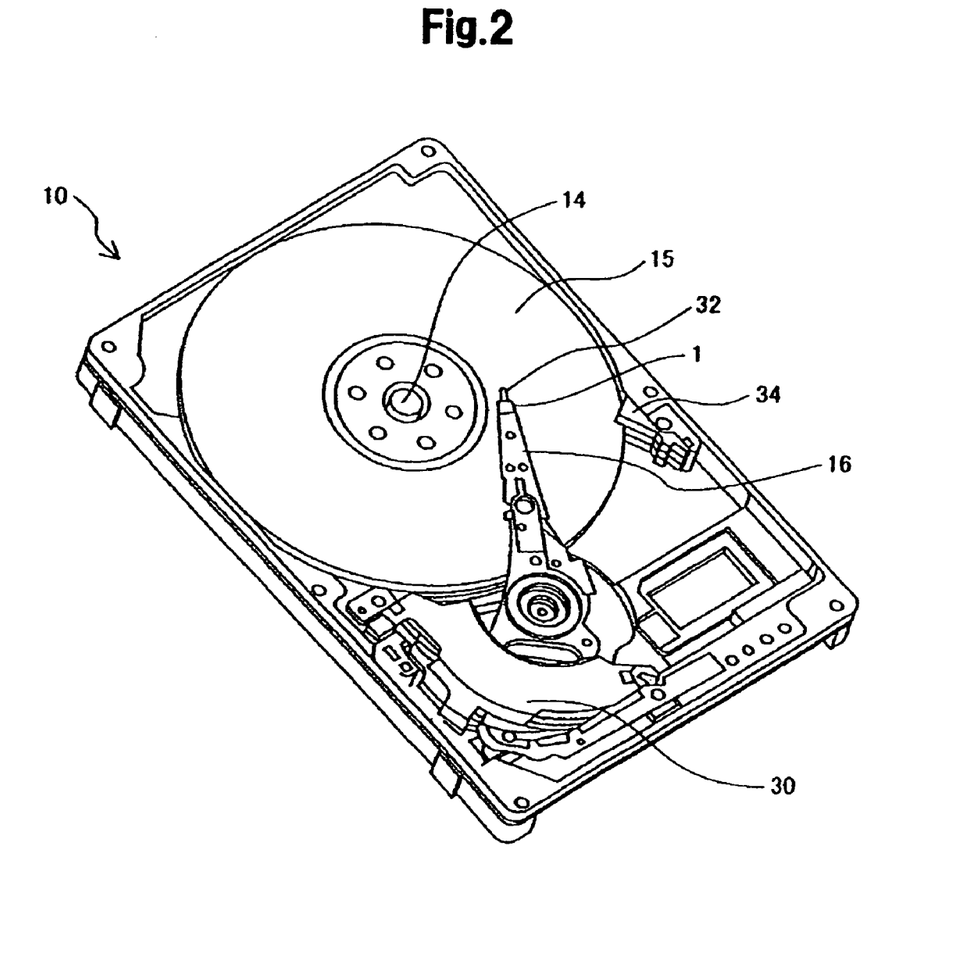
FIG. 2 is an exemplary perspective view of a magnetic disk drive provided with a magnetic head slider.
Figure 3:
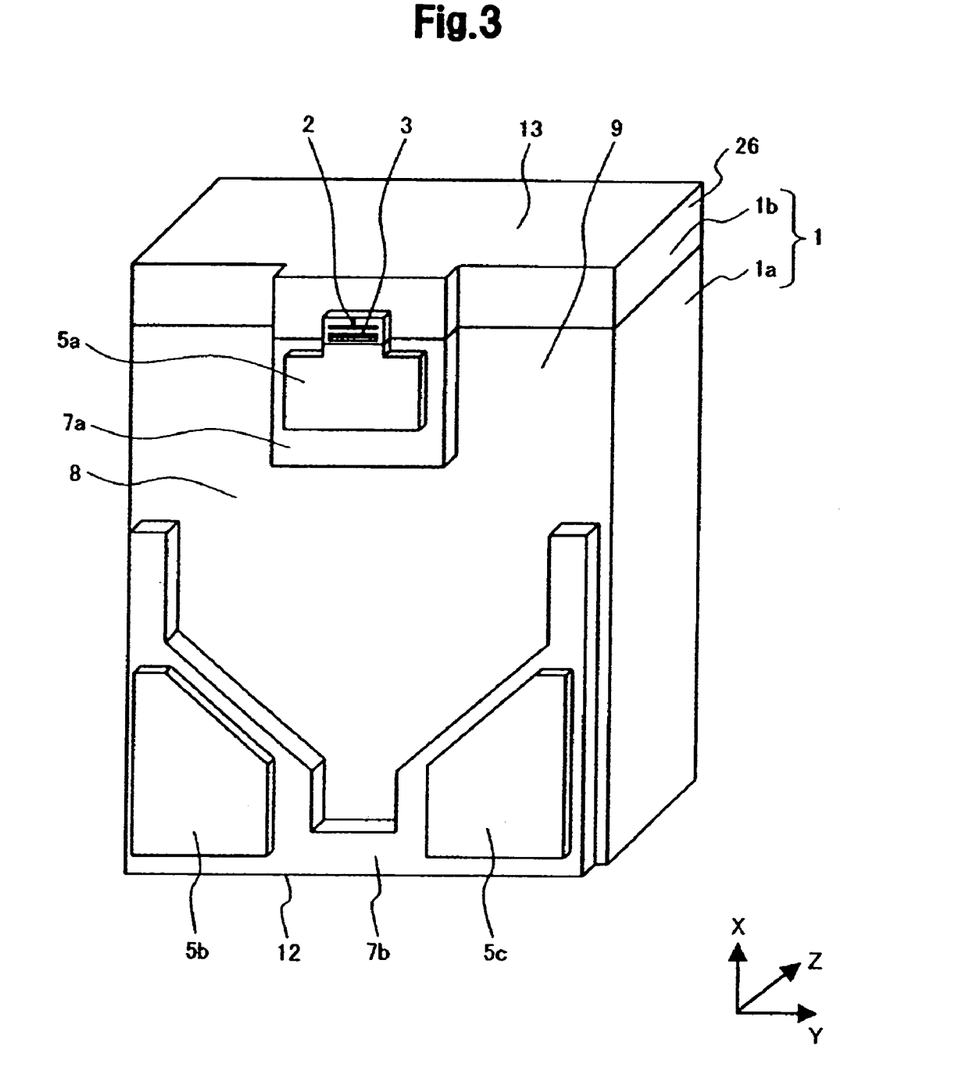
FIG. 3 is an exemplary perspective view of a magnetic head slider.

FIG. 3 is an enlarged view of the magnetic head slider 1 shown in FIG. 2. The magnetic slider 1 has a base (slider) 1a of a material represented by a sintered material of alumina and titanium carbide (hereinafter, referred to as "altic"), and a thin-film magnetic head part 1b. The magnetic head part 1b includes a write element (magnetic recording device) 2 formed on the base 1a by a thin-film deposition process, read element (a magnetic reproducing device) 3, and an insulating film 26. The write element 2 and the read element 3 are embedded in the insulating film 26.

The magnetic head slider 1, for example a conventionally called a picoslider, has a shape substantially resembling a rectangular solid of 1.25 mm in length, 1.0 mm in width and 0.3 mm in thickness. The magnetic head slider 1 has six surfaces, namely, an air bearing surface 9, an air entrance end surface 12, an air exit end surface 13, opposite side surfaces and a back surface. A slider called a femtoslider of a size about 70% of the picoslider is 0.85 mm in length, 0.7 mm in width and 0.23 mm in thickness.

Minute steps (bearing parts) are formed in the air bearing surface 9 by ion milling or etching. Air pressure is generated in a space between the air bearing surface 9 and the opposite surface of a disk (not shown) to create an air bearing that bears load applied to the back surface. It was confirmed that the present embodiment was effectively applicable to a slider having a thickness of 0.1 mm. The thickness of 0.1 mm is sufficient to enable forming a terminal having a side of 80 μm on the exit end surface of a slider in forming the respective terminals of the slider and a suspension when the slider and the suspension are bonded and wiring lines are formed.

The air bearing surface 9 is provided with the steps and is divided into substantially three kinds of parallel surfaces; rail surfaces 5 (5a, 5b and 5c) which are the closest to the disk, shallow groove surfaces 7 (7a and 7B), namely, step bearing surfaces, at a depth between about 100 and 200 nm from the rail surfaces 5, and a deep groove surface 8 at a depth of about 1 μm from the rail surfaces 5. When air currents generated by the rotating disk flow from the shallow groove surface 7b, namely, the step bearing, through a forward tapered passage to the rail surfaces 5b and 5c, air is compressed and a positive air pressure is generated. When air flows from the rail surfaces 5b and 5c, and the shallow groove surface 7b through a forward expanding passage to the deep groove surface 8, a negative air pressure is generated. In FIG. 3, the depths of the grooves are exaggerated.

The magnetic head slider 1 is designed so as to float in a position in which the floating height of the air entrance end 12 is greater than that of the air exit end 13. Therefore, the rail surface (device mounting surface) 5a in the vicinity of the exit end is the closest to the disk. Since the device mounting surface 5a protrudes in the vicinity of the exit end from the shallow groove surface 7a and the deep groove surface 8 extending around the device mounting surface 5a. The device mounting surface 5a is the closest to the disk unless the pitching and the rolling position of the slider slope beyond fixed limits. The write element 2 and the read element 3 are formed in a part of the device mounting surface 5a in the thin film head part 1b. The shape of the air bearing surface 9 is designed so that load exerted by the load beam 16 and the positive and the negative air pressure acting on the air bearing surface 9 may properly balance each other to hold the write element 2 and the read element 3 at a distance on the order of 10 nm from the disk.

The magnetic head including the write element 2, the read element 3 and the insulating layer 26 is formed in the thin-film head part 1b of the device mounting surface 5a. At least the device mounting surface 5a is coated with a protective film of carbon or the like to protect the magnetic recording and reproducing devices from corrosion.

Figure 1:
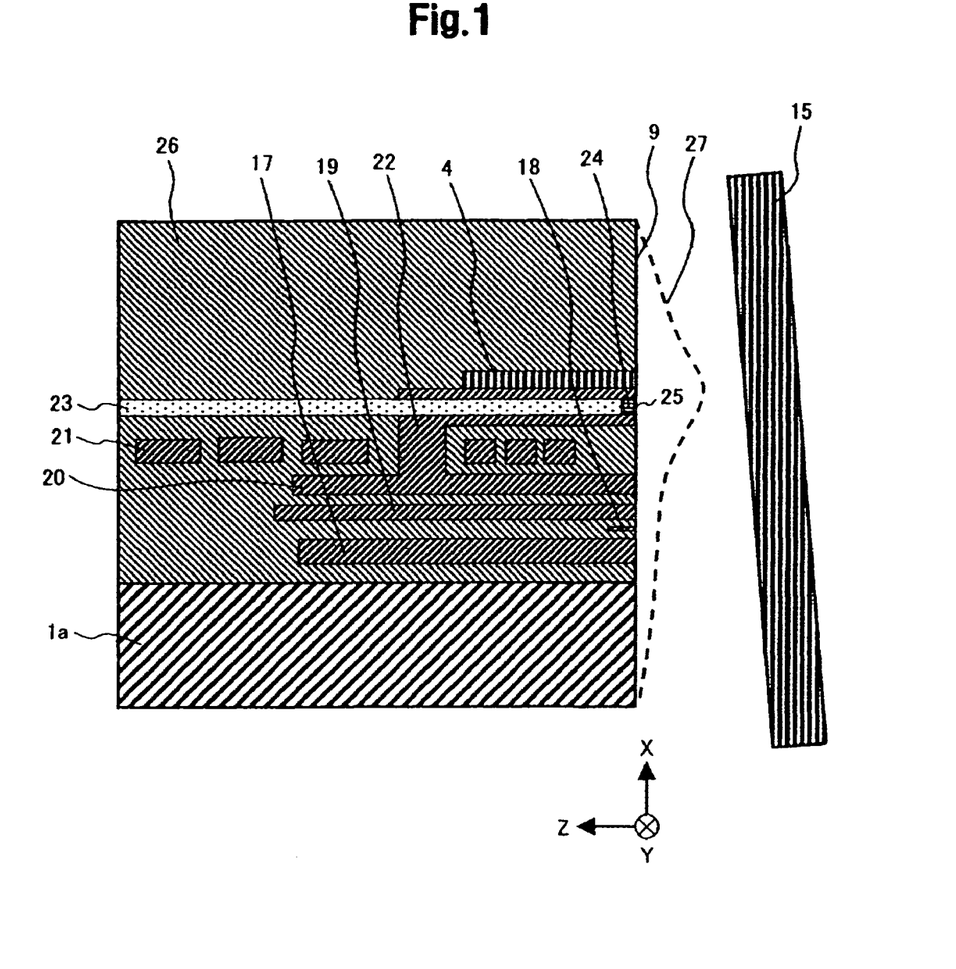
FIG. 1 is an exemplary sectional view of a part including a thin-film head of a magnetic head slider in a first embodiment.
Figure 4:
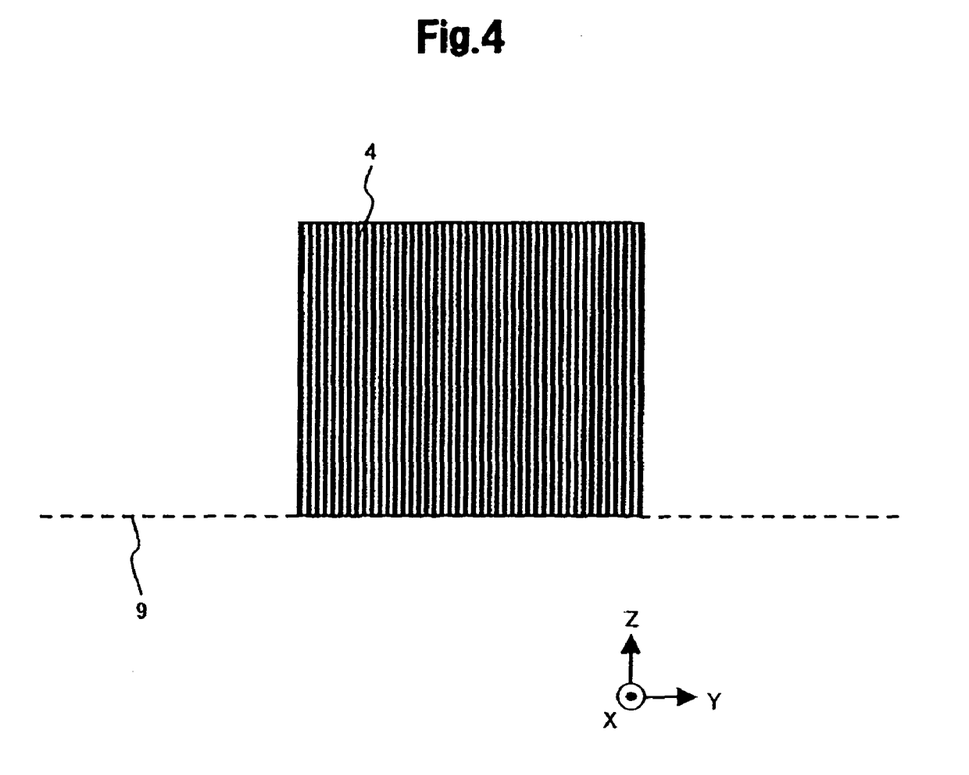
FIG. 4 is an exemplary view showing the shape of a heat radiating film of the first embodiment.

The construction of a magnetic head slider in a first embodiment will be described with reference to FIG. 1. The basic construction of the magnetic head slider is the same as that shown in FIG. 3. Only a device mounting surface 5a and a thin-film head part 1b, which are the features, are shown in an enlarged view in FIG. 1. An inductive recording device 2 that creates a magnetic field between magnetic poles when a current flows through a coil to record magnetic information, a magnetoresistive reproducing device 3 that measures resistance varied by a magnetic field, a heating mechanism 25 for heat-assisted recording, and a heat radiating film 4 for diffusing heat are formed by thin-film deposition processes in the thin-film head part 1b. More concretely, the thin-film head part 1b is provided with a reproducing device 2 including a lower magnetic shield 17, a magnetoresistive device 18 and an upper magnetic shield 19; a recording device 3 including a lower magnetic pole 20, an upper magnetic pole 22 magnetically connected to the lower magnetic pole 20 on the opposite side of the air bearing surface 9, and a write coil 21 wound round a magnetic circuit formed by the lower magnetic pole 20 and the upper magnetic pole 22; an insulating film 26 coating the reproducing device 2 and the recording device 3; and a heating mechanism 25 for heat-assisted recording including an optical wave guide 23 and a near-field light emitting device 24, which are formed on an altic base 1a by thin-film deposition processes including plating, sputtering and polishing. The optical waveguide 23 and the near-field light emitting device 24 forming the heating mechanism 25 for heat-assisted recording are formed in the upper magnetic pole 22. Most part of light transmitted by the optical wave guide 23 is converted into heat (heat loss) by the near-field light emitting device 24 to generate heat in the vicinity of the write element 2. When a part in the vicinity of the write element is heated by the heat generated by the heating mechanism 25 for heat-assisted recording, a thermal protrusion 27 of a size on the order of several nanometers occurs. Consequently, the device approaches a disk 15 and the floating height of the device decreases. However, since the heat radiating film 4 is formed very close to the upper magnetic pole 22 in almost close contact with the upper magnetic pole 22 so as to be closest to the near-field light emitting device 24 where heat is generated as shown in FIG. 1, the heat generated by the heating mechanism 25 for heat-assisted recording may be efficiently radiated and floating height reduction due to the thermal protrusion may be reduced. FIG. 4 is a view of the heat radiating film 4 taken from the side of the exit end 13 of the magnetic head slider 1.

The heat radiating film 4 needs to be formed of a material having a thermal conductivity higher than the insulating film 26 formed of alumina ($Al_2O_3$) or the like on the slider base 1a, such as Au, Cu, Ni, Fe or W, or a material chosen from ceramic materials, such as $Al_2O_3$—TiC and SiC (for example, a metal, an alloy or a compound).

Figure 5:
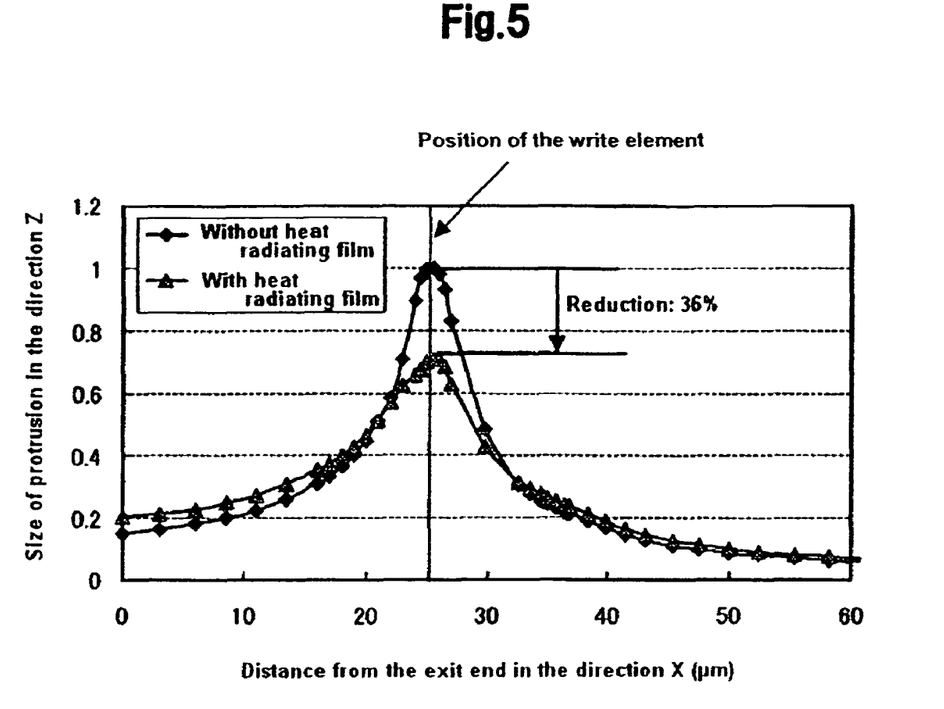
FIG. 5 is an exemplary graph showing analytical results showing the effect of the first embodiment.

Thermal deformation analysis was conducted assuming by a finite element method that heat was generated by the near-field light emitting device 24 to confirm the effect of the heat radiating film construction of the embodiment. FIG. 5 comparatively shows a mode of thermal protrusion when the heat radiating film 4 is formed and a mode of thermal protrusion when the heat radiating film 4 is not formed. In FIG. 5, values of sizes of the protruded parts in the direction Z are those normalized by the maximum size of protruded part when any heat radiating film is not formed. It is known from FIG. 5 that the heat radiating film 4 reduced the size of the thermal protrusion caused by the heating mechanism 25 for heat-assisted recording by 36% as compared to without the heat radiating film 4.

Figure 6:
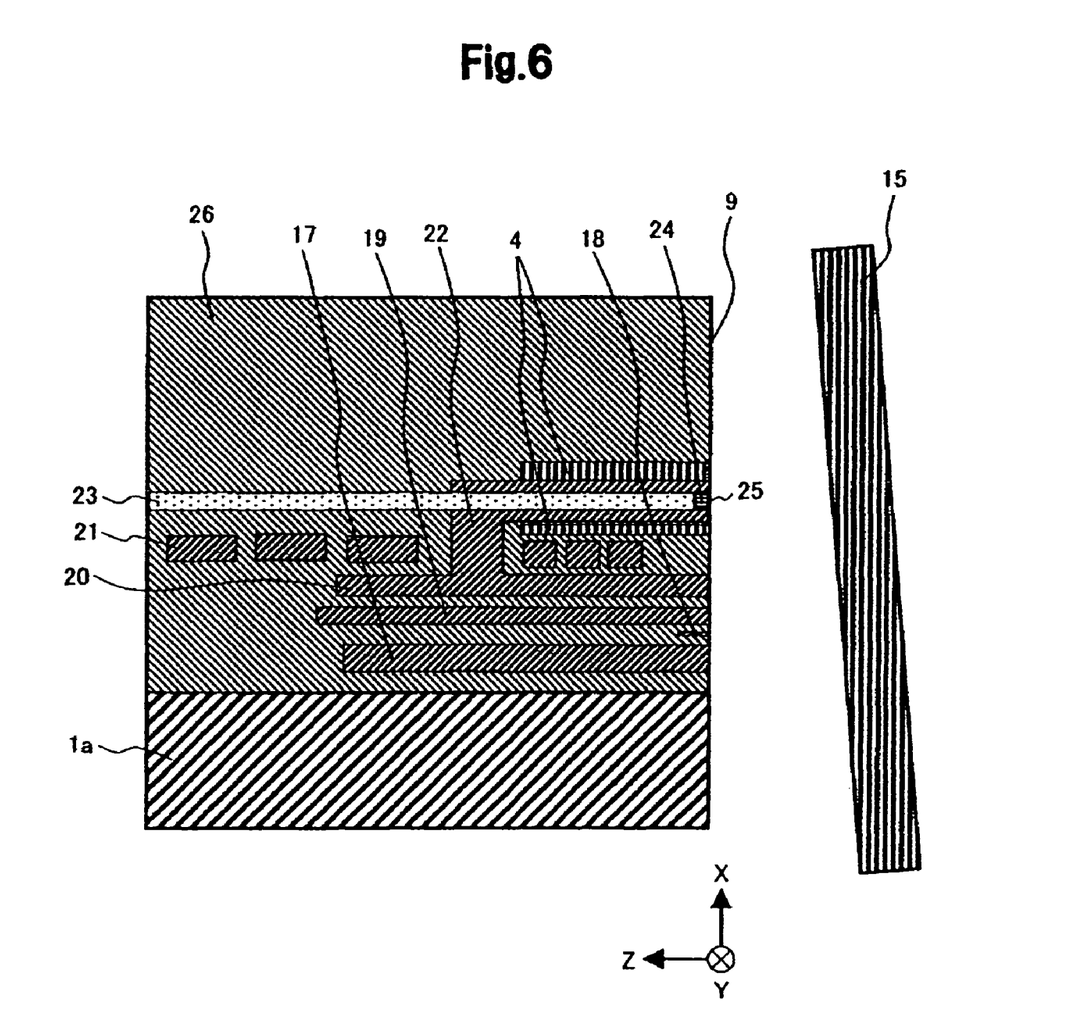
FIG. 6 is an exemplary sectional view of assistance in explaining the disposition of a heat radiating film of a second embodiment.

The arrangement of a heat radiating film in a magnetic head slider in a second embodiment will be described with reference to FIG. 6. In the first embodiment shown in FIG. 1, the heat radiating film 4 is formed only on the upper part (on the side of the exit end) of the upper magnetic pole 22. In the second embodiment, heat radiating films 4, namely, first and second heat radiating films, are formed over and under a near-field light emitting device 24 and an upper magnetic pole 22, respectively. Thus, heat radiating effect may be enhanced. The material of the first and the second heat radiating film is the same as the first embodiment.

Figure 7:
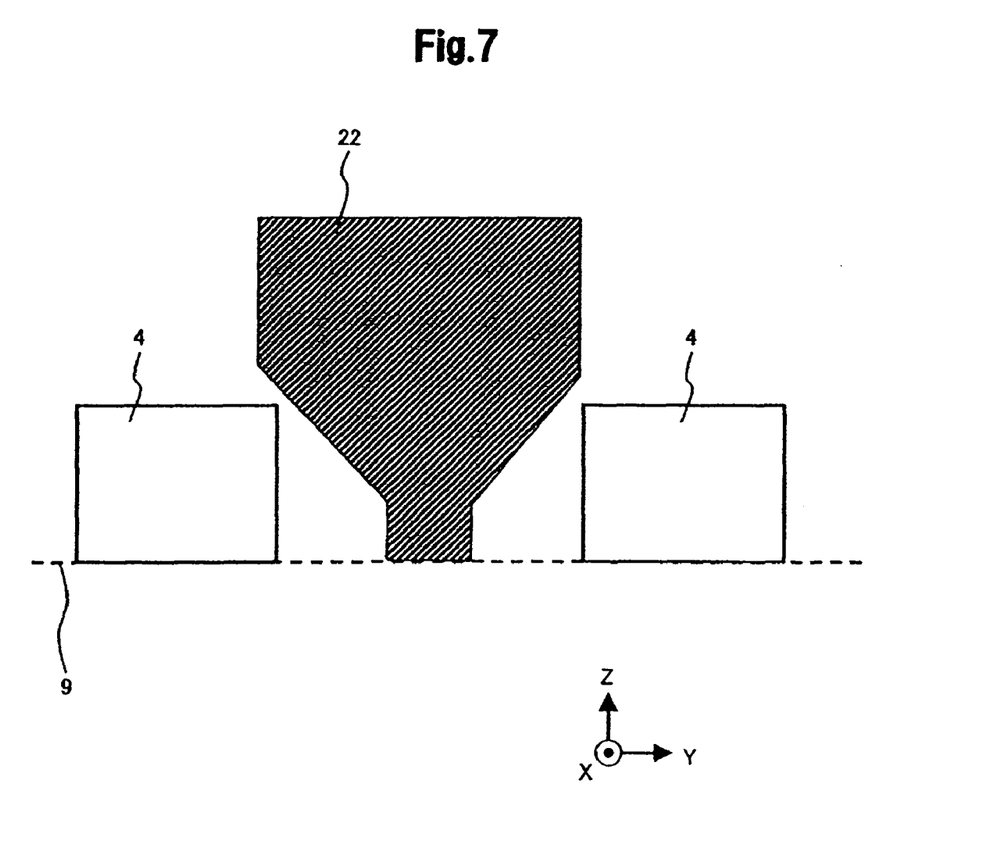
FIG. 7 is an exemplary sectional view of assistance in explaining the disposition of a heat radiating film of a third embodiment.

The arrangement of a heat radiating film in a magnetic head slider in a third embodiment will be described with reference to FIG. 7. In FIG. 7, hat radiating films 4 are formed on the transversely opposite sides, respectively, of a near-field light emitting device 24 and an upper magnetic pole 22. The effect of this arrangement is similar to those of the first and the second embodiment.

Figure 8:
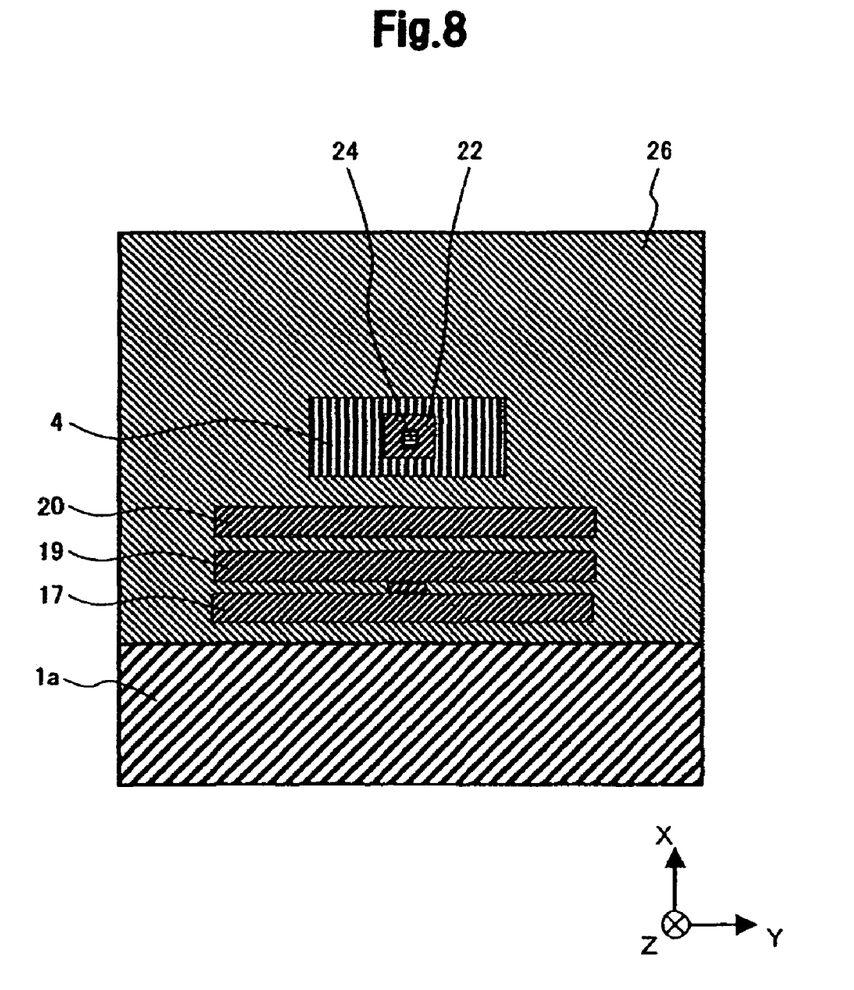
FIG. 8 is an exemplary sectional view of assistance in explaining the disposition of a heat radiating film of a fourth embodiment.

The arrangement of a heat radiating film in a magnetic head slider in a fourth embodiment will be described with reference to FIG. 8. FIG. 8 is a view of a read/write device from the side of an air bearing surface 9. In a structure shown in FIG. 8, a heat radiating film 4 is formed so as to surround a near-field light emitting device 24 and an upper magnetic pole 22 entirely. This structure has a high heat radiating effect.

The arrangement of a heat radiating film in a magnetic head slider in a fifth embodiment will be described with reference to FIG. 9. The fifth embodiment is characterized by a heat radiating film 4 of a shape having a surface opposite an air bearing surface and having a sectional area gradually increasing toward the air bearing surface. When the magnetic head slider 1 is in a floating state, most part of heat generated in the vicinity of a read/write device dissipates through the air bearing surface 9 because the thermal conductivity of the air bearing surface 9 is very high as compared with those of other five surfaces of the slider. Therefore, the heat radiating film 4 is formed in a shape capable of efficiently radiating heat through the side of the air bearing surface 9 to enhance a thermal protrusion reducing effect by increasing a heat radiating effect. When the heat radiating film 4 is formed in a shape such that the sectional area of a surface opposite the air bearing surface increases gradually toward the air bearing surface, it is difficult for heat to diffuse in a direction away from the air bearing surface 9 (a direction along floating height) and is easy for heat to diffuse toward the air bearing surface 9. Consequently, the thermal protrusion reducing effect may be enhanced by thus improving the heat radiating effect.

Figure 10:
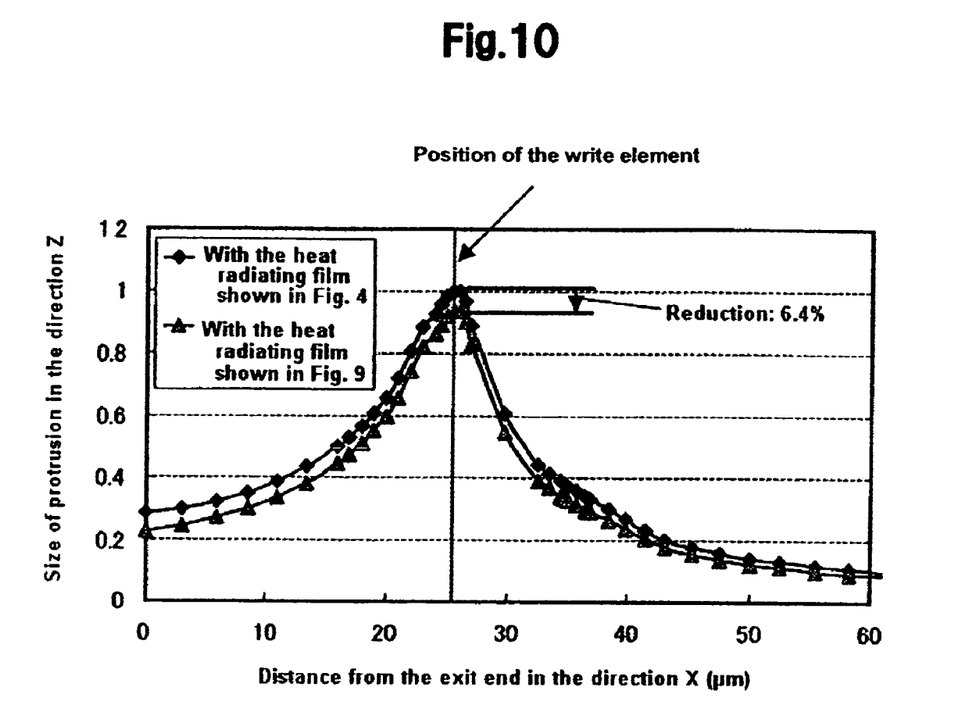
FIG. 10 is an exemplary graph showing analytical results showing the effect of the fifth embodiment.

Thermal deformation analysis was conducted assuming by a finite element method that heat was generated by the near-field light emitting device 24 to confirm the effect of the shape of the heat radiating film on thermal protrusion reduction. FIG. 10 shows the dependence of thermal protrusion on the shape of the heat radiating film 4. Values of sizes of protruded part in the direction Z shown in FIG. 10 are those normalized by the maximum value of a protruded part of the heat radiating film of the first embodiment having a shape shown in FIG. 4. It is known from FIG. 10 that the heat radiating film 4 having a shape in which the sectional area of a surface of the heat radiating film 4 opposite the air bearing surface increases toward the air bearing surface reduced the size of the thermal protrusion caused by the heating mechanism for heat-assisted recording by 6.4% compared to the first embodiment.

Figure 9:
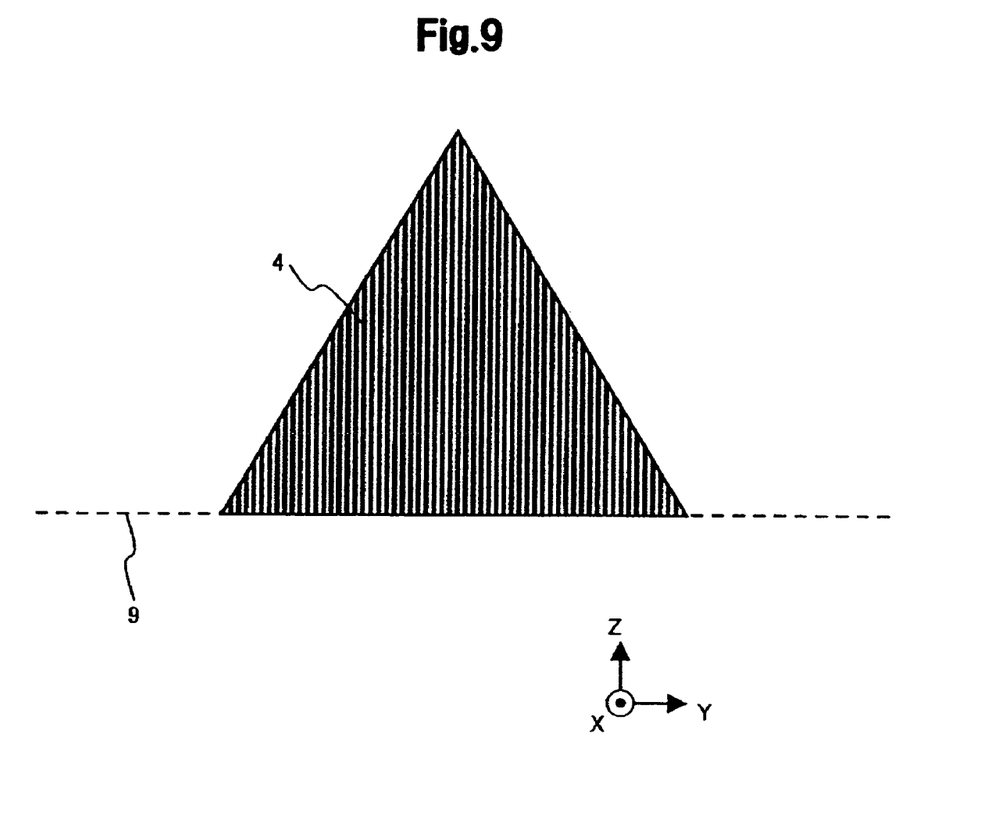
FIG. 9 is an exemplary view of assistance in explaining the shape of a heat radiating film in a fifth embodiment.
Figure 11:
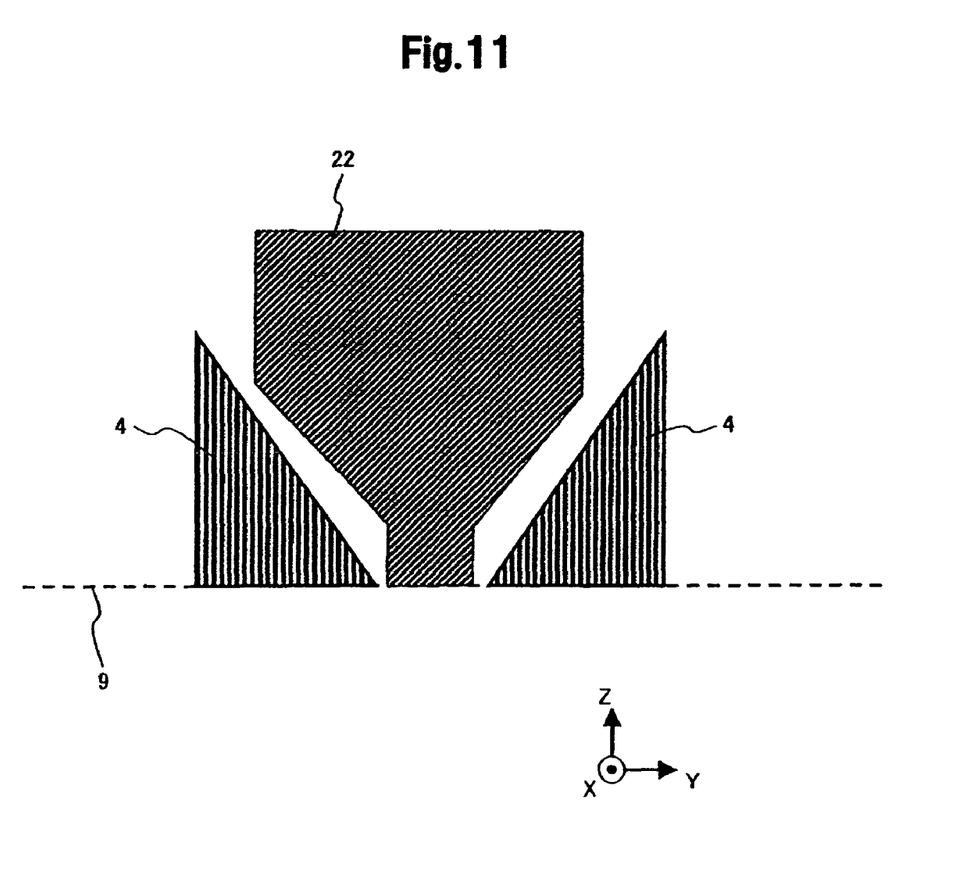
FIG. 11 is an exemplary view of a heat radiating film in a modification of the heat radiating film of the third embodiment.
Figure 12:
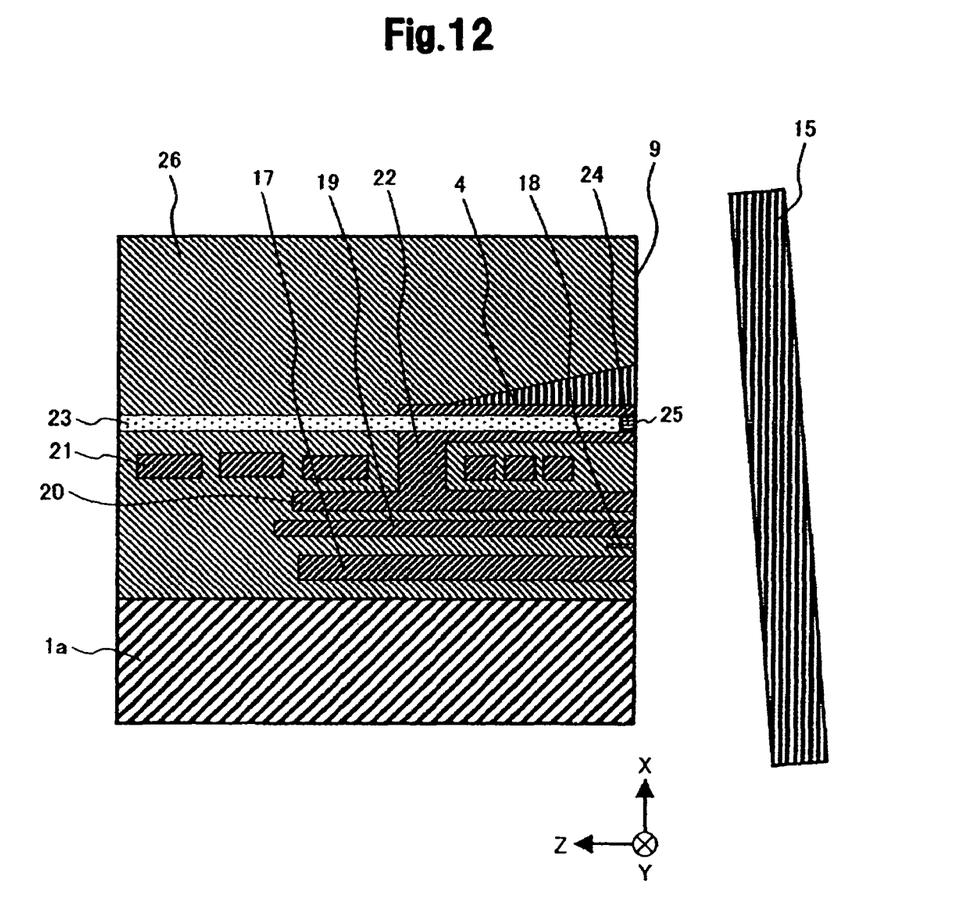
FIG. 12 is an exemplary view of a heat radiating film in a modification of the heat radiating film of the fifth embodiment.

It is known from the foregoing results that the size of the thermal protrusion may be reduced still more by forming heat radiating films 4 on the right and the left side of the upper magnetic pole 22 in a shape such that the sectional area of a surface opposite the air bearing surface increases gradually toward the air bearing surface as shown in FIG. 11 according to the structure of the third embodiment (FIG. 7), or by forming a heat radiating film 4 in a shape expanding (thickening) not only in a direction along the width of the slider (direction Y), but also in a direction along the length of the slider ((direction X) as shown in FIG. 12 according to the structure of the fifth embodiment (FIG. 9).

Figure 13:
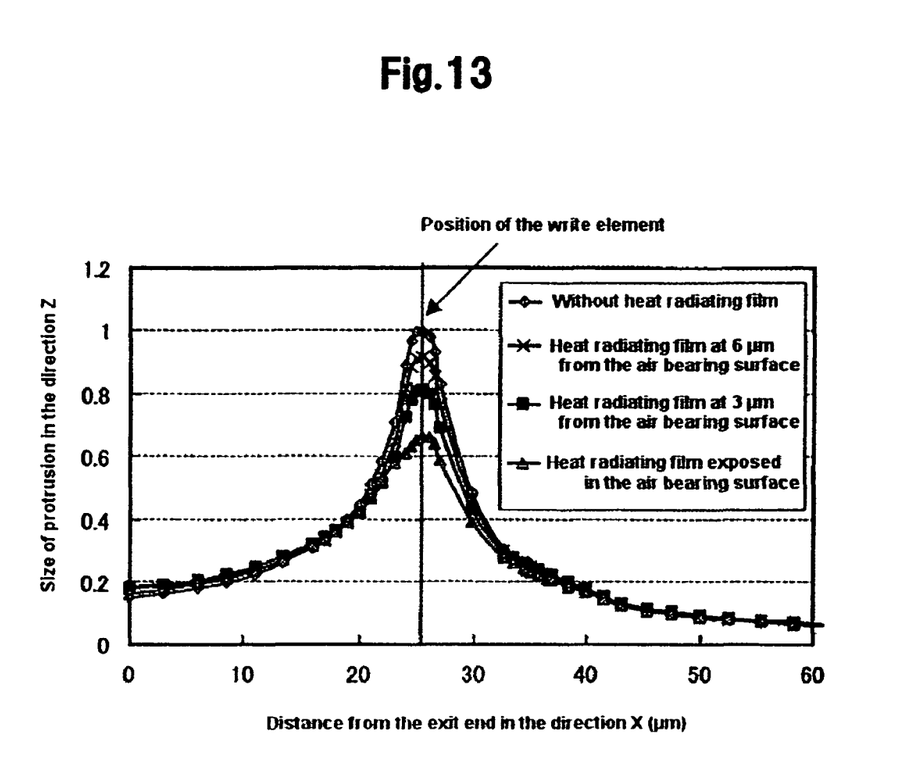
FIG. 13 is an exemplary graph showing the relation between the distance between a heat radiating film and an air bearing surface, and the size of a protrusion.

Variations of protrusion reducing effect when the surface, facing the air bearing surface 9, of the heat radiating film 4 of the fifth embodiment (FIG. 9) is moved away from the air bearing surface 9 in the direction Z will be described with reference to FIG. 13. The size of protrusion in the direction Z shown in FIG. 13 are those normalized by the maximum size of a protrusion formed when any heat radiating film is not formed. As obvious from FIG. 13, protrusion reducing effect diminishes as the distance between the surface of the heat radiating film 4 facing the air bearing surface 9 and the air bearing surface 9 increases. Protrusion reducing effect may be increased to a maximum by exposing the surface of the heat radiating film 4 facing the air bearing surface 9 in the air bearing surface 9.

Figure 14:
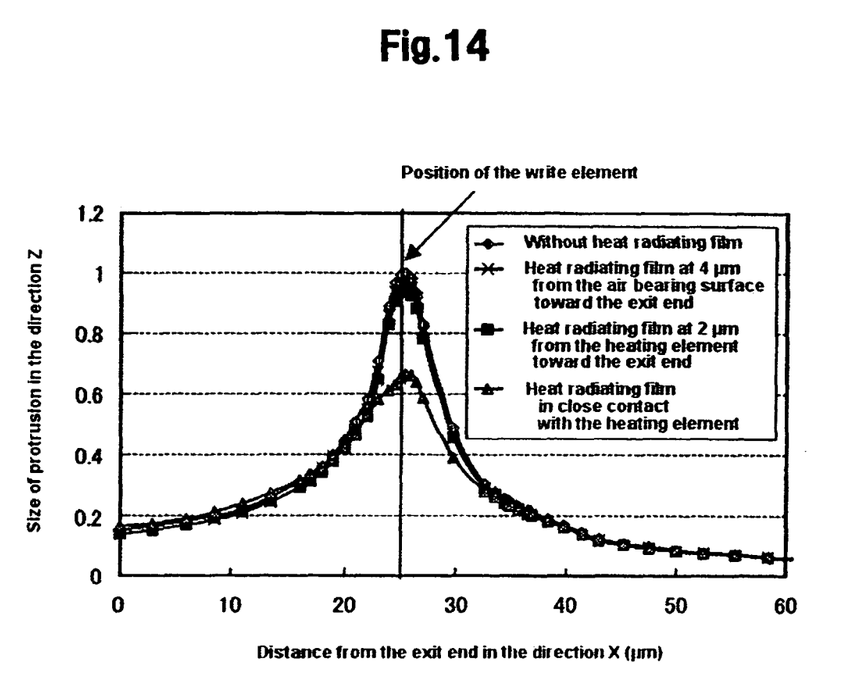
FIG. 14 is an exemplary graph showing the relation between the distance between a heat radiating film and an upper magnetic pole, and the size of a protrusion.

Variations of protrusion reducing effect when the heat radiating film 4 of the fifth embodiment is moved away from the upper magnetic pole 22 toward the exit end in the direction X will be described with reference to FIG. 14. The sizes of a protrusion in the direction Z shown in FIG. 14 are those normalized by the maximum size of a protrusion formed when any heat radiating film is not formed. As obvious from FIG. 14, protrusion reducing effect diminishes as the distance between the heat radiating film 4 and the upper magnetic pole 22 increases. Protrusion reducing effect may be increased to a maximum by disposing the heat radiating film 4 very close to the upper magnetic pole 22 virtually in close contact with the upper magnetic pole 22.

As mentioned above, in the embodiments, the heat radiating film for reducing the size of the thermal protrusion by radiating heat generated by the heating mechanism for heat-assisted recording is formed very close to the heating mechanism, virtually in close contact with the heating mechanism, and the heat radiating film is formed in a shape such that the sectional area of the surface thereof facing the air bearing surface increases gradually toward the air bearing surface. Thus, the size of the thermal protrusion attributable to the heating mechanism for heat-assisted recording may be reduced and the contact between the magnetic head and the magnetic disk may be avoided.

What is claimed is:

1. A magnetic head slider for heat-assisted recording comprising:
    an insulating film formed on an end surface of a slider;
    a read element, a write device, and a heating mechanism embedded in the insulating film, wherein the heating mechanism is used to heat a recording medium;
    and a heat radiating film formed near the heating mechanism and having an end surface exposed to an air bearing surface; wherein the heat radiating film has a thermal conductivity higher than that of the insulating film,
    wherein the heat radiating film has a surface facing the air bearing surface and has a sectional area that gradually increases toward the air bearing surface, and
    wherein the heat radiating film is centered on, and entirely surrounds, an upper magnetic pole.

2. The magnetic head slider according to claim 1, wherein the write device includes a lower magnetic pole, the upper magnetic pole magnetically connected to the lower magnetic pole on a side opposite the air bearing surface, and a write coil wound round a magnetic circuit formed by the lower and the upper magnetic pole; wherein the heating mechanism is embedded in the upper magnetic pole; and wherein the heat radiating film is disposed on the upper side of the upper magnetic pole.

3. The magnetic head slider according to claim 1, wherein the write device includes a lower magnetic pole, the upper magnetic pole magnetically connected to the lower magnetic pole on a side opposite the air bearing surface, and a write coil wound round a magnetic circuit formed by the lower and the upper magnetic pole; wherein the heating mechanism is embedded in the upper magnetic pole; and wherein the heat radiating film has a first heat radiating film overlying the upper magnetic pole, and a second heat radiating film underlying the upper magnetic pole.

4. The magnetic head slider according to claim 1, wherein the insulating film is formed of $Al_2O_3$; and the heat radiating film is made of a metal chosen from Au, Cu, Ni, Fe and W, an alloy of two or more of those metals, either of $Al_2O_3$-TiC or SiC, or a compound of $Al_2O_3$-TiC and SiC.

5. The magnetic head slider according to claim 1, wherein the thickness of the heat radiating film gradually increases toward the air bearing surface.

6. The magnetic head slider according to claim 1, wherein the heat radiating film disposed on transversely opposite sides of the heating mechanism.

7. A magnetic head slider according to claim 1, wherein the heat radiating film surrounds the heating mechanism.

* * * * *